(12) United States Patent
Wright et al.

(10) Patent No.: US 8,892,680 B2
(45) Date of Patent: Nov. 18, 2014

(54) SYSTEM AND METHOD FOR CACHING CONTENT ELEMENTS WITH DYNAMIC URLS

(75) Inventors: Stephen Wright, Belfast (GB); Robert Logue, Belfast (GB)

(73) Assignee: Openwave Mobility, Inc., Redwood City, CA (US)

( * ) Notice: Subject to any disclaimer, the term of this patent is extended or adjusted under 35 U.S.C. 154(b) by 400 days.

(21) Appl. No.: 13/013,649

(22) Filed: Jan. 25, 2011

(65) Prior Publication Data

US 2012/0191804 A1   Jul. 26, 2012

(51) Int. Cl.
*G06F 15/16* (2006.01)
*H04L 29/08* (2006.01)
*G06F 17/30* (2006.01)

(52) U.S. Cl.
CPC ...... *G06F 17/30902* (2013.01); *H04L 29/0809* (2013.01); *Y10S 705/901* (2013.01)
USPC ........... 709/217; 709/219; 707/705; 707/758; 707/781; 726/26; 705/901

(58) Field of Classification Search
None
See application file for complete search history.

(56) References Cited

U.S. PATENT DOCUMENTS

| | | | | |
|---|---|---|---|---|
| 5,915,249 | A * | 6/1999 | Spencer | 707/742 |
| 6,418,544 | B1 * | 7/2002 | Nesbitt et al. | 714/43 |
| 7,539,776 | B1 | 5/2009 | Saare et al. | |
| 7,613,780 | B2 * | 11/2009 | DeSalvo | 709/206 |
| 7,827,613 | B2 * | 11/2010 | Koved et al. | 726/26 |
| 7,849,270 | B2 | 12/2010 | Sundarranjan et al. | |
| 8,020,193 | B2 * | 9/2011 | Bhola et al. | 726/1 |
| 8,103,783 | B2 * | 1/2012 | Plamondon | 709/229 |
| 2002/0035605 | A1 | 3/2002 | McDowell et al. | |
| 2002/0099785 | A1 | 7/2002 | Teeple | |
| 2003/0097451 | A1 | 5/2003 | Bjorsten et al. | |
| 2003/0120680 | A1 * | 6/2003 | Agrawal et al. | 707/103 R |
| 2003/0121680 | A1 * | 7/2003 | Izumisawa et al. | 173/93.5 |
| 2003/0130893 | A1 | 7/2003 | Farmer | |
| 2003/0145038 | A1 | 7/2003 | Tariq et al. | |
| 2003/0204613 | A1 | 10/2003 | Hudson et al. | |
| 2004/0078293 | A1 | 4/2004 | Iverson et al. | |
| 2004/0098748 | A1 | 5/2004 | Bo et al. | |
| 2005/0166072 | A1 | 7/2005 | Converse et al. | |

(Continued)

FOREIGN PATENT DOCUMENTS

EP  1675023 A1 *  6/2006
WO  0215531 A1     2/2002

OTHER PUBLICATIONS

Marshall, James. "HTTP Made Really Easy." Web log post. Web Technology Made Really Easy. N.p. Mar. 6, 2009. Web. May 21, 2013. <http://www.jmarshal.com/easy/http/>.*

(Continued)

*Primary Examiner* — Saleh Najjar
*Assistant Examiner* — Jason Plotkin

(57) ABSTRACT

A system and method for allowing requests generated as a result of dynamic URLs to be efficiently looked up in a cache are provided. The system and method involve receiving a request for a content element, the request being generated from a dynamic URL. A static content element identifier is generated from the request. In an embodiment, the static content element identifier includes only the content identification parameters and the dynamic parameters are removed. The static content element identifier is then used to determine whether the content element is in the cache.

19 Claims, 7 Drawing Sheets

(56) References Cited

U.S. PATENT DOCUMENTS

| | | |
|---|---|---|
| 2005/0215238 A1 | 9/2005 | Macaluso |
| 2006/0129635 A1* | 6/2006 | Baccou et al. ................ 709/203 |
| 2006/0195660 A1* | 8/2006 | Sundarrajan et al. ......... 711/118 |
| 2007/0133405 A1 | 6/2007 | Bowra et al. |
| 2007/0280462 A1 | 12/2007 | Neece |
| 2008/0133830 A1 | 6/2008 | Nitta et al. |
| 2009/0094377 A1 | 4/2009 | Zahavi et al. |
| 2009/0157834 A1 | 6/2009 | Krishnaswamy |
| 2009/0183000 A1* | 7/2009 | Krig .............................. 713/168 |
| 2009/0196218 A1 | 8/2009 | Pulini et al. |
| 2009/0210631 A1 | 8/2009 | Bosworth et al. |
| 2009/0254657 A1 | 10/2009 | Melnyk et al. |
| 2009/0254707 A1* | 10/2009 | Alstad ........................... 711/118 |
| 2010/0034089 A1 | 2/2010 | Kovvali et al. |
| 2010/0034218 A1 | 2/2010 | Kovvali et al. |
| 2010/0057883 A1 | 3/2010 | Cao et al. |
| 2010/0131487 A1 | 5/2010 | Lopez et al. |
| 2010/0158026 A1 | 6/2010 | Valmikam et al. |

OTHER PUBLICATIONS

Marshall, James. "HTTP Made Really Easy." Web log post. Web Technology Made Really Easy. N.p. Mar. 6, 2009. Web. May 21, 2013. /www.jmarshal.com/easy/http/>.*

International Search Report and Written Opinion; PCT/EP2012/051113; Feb. 4, 2012.

Enhua Tan, Lei Guo, Songqing Chen, and Xiaodong Zhang, "SCAP: Smart Caching in Wireless Access Points to Improve P2P Streaming", Proceedings of the 27th International Conference on Distributed Computing Systems {IEEE ICDCS 2007), Toronto, Canada, Jun. 25-29, 2007.

Alex Zambelli, "IIS Smooth Streaming Technical Overview", Windows Server Internet Information Services 7.0, Microsoft Corporation, Mar. 2009.

R. Pantos, Ed., "HTTP Live Streaming", Informational Internet-Draft, Apple, Inc., Jun. 8, 2009.

Urs Niesen, Devavrat Shah, Gregory Wornell, "Caching in Wireless Networks", Aug. 13, 2009.

* cited by examiner

SYSTEM AND METHOD FOR CACHING CONTENT ELEMENTS WITH DYNAMIC URLS

BACKGROUND

Certain webpages present dynamic URLs to users browsing the webpage. These dynamic URLs can contain a large number of parameters. However, only a few of these parameters identify content elements to which the URL is directed. Most of the parameters are used to perform access control and/or to send contextual data along with the dynamic URL when the URL is selected. Because dynamic URLs are very dependent on the information related to the user or environmental data, each user is typically presented with a different dynamic URL and even the same user may be presented with different dynamic URLs for the same content element, as dynamic URLs change frequently. The large number of dynamic URLs poses a problem when trying to cache content elements associated with the dynamic URLs since each request will differ greatly, even requests for the same content element. In conventional cache systems, dynamic URLs cause the cache to be populated with duplicate copies of the same content element.

SUMMARY

A method for caching content elements that are requested using dynamic URLs is disclosed. In an embodiment, an HTTP request for a content element is received, with the HTTP request being generated as a result of a dynamic URL selected at a user device. A static content element identifier is generated from the HTTP request and the static content element identifier is used to determine whether the content element is in the cache. The static content element identifier is agnostic to dynamic parameters and thus the static content element identifier will be the same for the same requested content element. This allows the cache controller to recognize cached content elements that were requested by the user device using the dynamic URL, without creating duplicate copies in the cache for the same content elements.

A system in accordance with an embodiment of the invention includes a cache controller configured to receive a request for a content element, the request being generated from a dynamic URL, and to generate a static content element identifier based on the request, whereby the static content element identifier is used to determine whether the content element is in a cache.

A system in accordance with another embodiment of the invention includes a processor and a memory for storing executable instructions, which when executed by the processor perform the steps of receiving an HTTP request for a content element, the HTTP request being generated from a dynamic URL, generating a static content element identifier from the HTTP request, and determining whether the content element is in a cache by using the static content element identifier.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
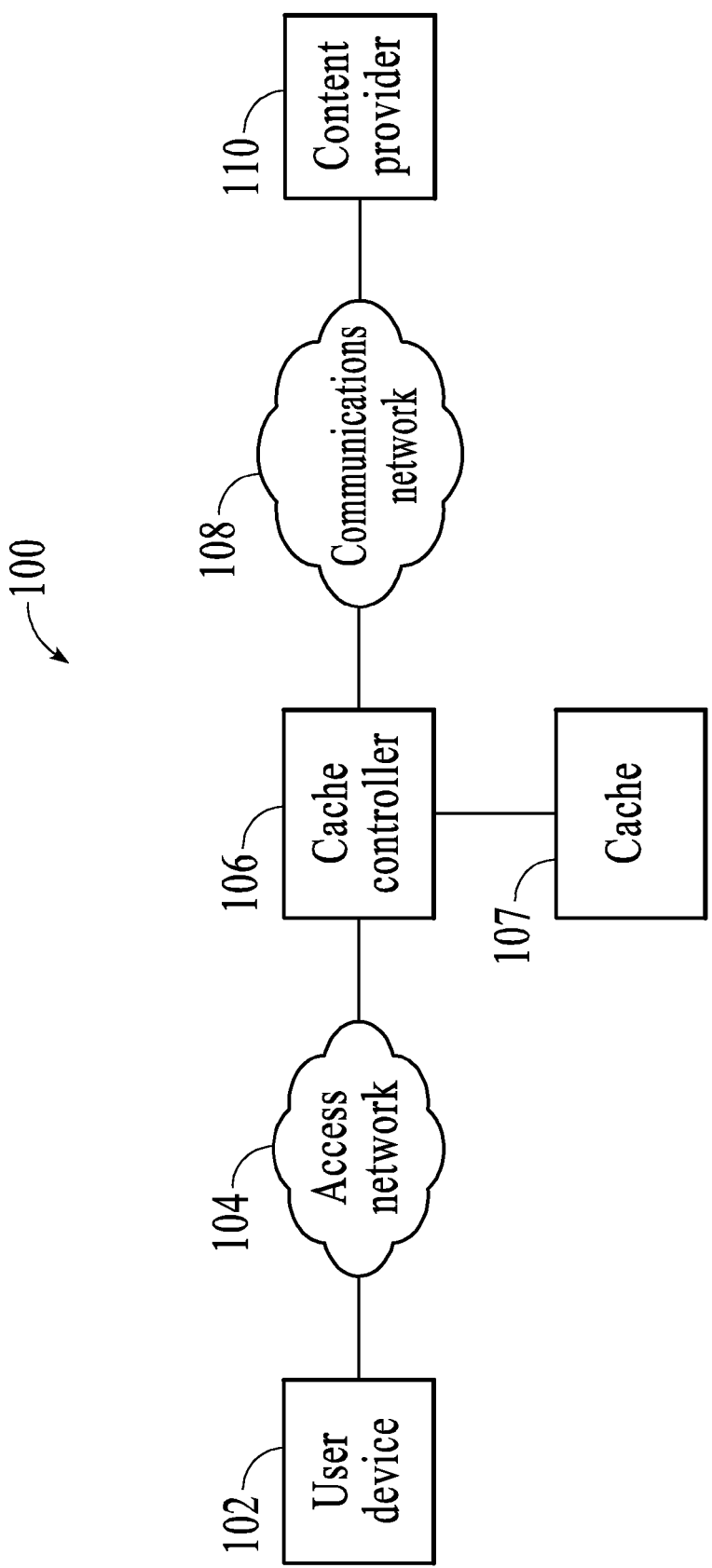
FIG. 1 depicts a schematic block diagram of a network that includes a cache controller in accordance with an embodiment of the invention.

FIG. 1 depicts a networked environment that includes a cache controller 100 in accordance with an embodiment of the invention. As described in more detail below, the networked environment includes a user device 102, an access network 104, a cache controller 106, a cache 107, a communications network 108, and a content provider 110 as depicted in FIG. 1. Although FIG. 1 is described with respect to a user device and a content provider, the description is not limited to a single user device and content provider.

The user device 102 is any networked device including, without limitation, a mobile phone, a smart phone, a personal digital assistants (PDAs), a tablet, a set-top box, a video player, a laptop, or a personal computers (PC). In one embodiment, the user device is a wireless device that can support various different RF communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE) and IEEE 802.16 standards bodies. Although some wireless communications protocols are identified herein, it should be understood that the present disclosure is not limited to the cited wireless communications protocols. In another embodiment, the user device is a wired device that communicates with the access network through a communication interface, such as analog modem, ISDN modem or terminal adapter, DSL modem, cable modem, Ethernet/IEEE 802.3 interface, or a combination thereof. In another embodiment, the user device is connected to the access network via a combination of wireless and wired communication interfaces.

The access network 104 provides a communications interface for the user device 102 to access the communications network 108 (e.g., the Internet or an intranet). Typical access networks include wireless service provider networks (e.g., that offer 3G, 4G and/or WiFi access) and Internet Service Providers (ISPs, e.g., that offer dial-up, DSL, and cable modem access). A private enterprise network can also serve as the access network if client devices within the private enterprise network can access the Internet through the private enterprise network.

In one embodiment, the access network 104 is a wireless service provider network that provides a wireless communications interface for the user device 102. In an embodiment, the wireless service provider network is accessible on a subscription basis (e.g., prepaid or post-paid) as is known in the field. In an embodiment, the wireless service provider network is a closed domain that is accessible only by a subscriber (e.g. a user of the user device) that is in good standing with the operator of the wireless service provider network. The wireless service provider network may include a radio access network (not shown) and an Internet gateway (not shown). The radio access network includes one or more base stations to facilitate communications among wireless devices that are within a communication range of the base stations. Each base station has at least one RF transceiver and the base stations communicate with the wireless devices using RF communication signals. The radio access network facilitates network communications among multiple wireless devices within the same wireless service provider network and between wireless devices in other wireless service provider networks and provides interfaces to facilitate communications with other entities, such as a Public Switched Telephone Network (PSTN), a Wide Area Network (WAN), the Internet, Internet servers, hosts, etc., which are outside of the wireless service provider network. In an embodiment, the wireless service provider network is operated by a single wireless service provider, such as, for example, AT&T, VERIZON, T-MOBILE, and SPRINT.

The Internet gateway (not shown) of the access network 104 provides a gateway for communications between the user device 102 and Internet-connected hosts and/or servers, which can also be referred to as the "cloud." The Internet gateway may include a Serving General Packet Radio Service (GPRS) Support Node (SGSN) and a Gateway GPRS Support Node (GGSN). For example, the Internet gateway can be a Wireless Application Protocol (WAP) gateway that converts the WAP protocol used by the access network (such as a wireless service provider network) to the HTTP protocol used by the Internet. In an embodiment, the Internet gateway enables the user device to access multimedia content, such as HTML, compact HTML (cHTML), and extensible HTML (xHTML), which is stored on Internet-connected hosts and/or servers. In this way, the access network provides access to the Internet for its subscribers.

The cache controller 106 is in the data path of communications between the user device 102 and the content provider 106 and is implemented in, for example, a proxy server or gateway and the cache controller can be implemented in hardware and/or software. In one embodiment, the cache controller is located between the access network 104 and the communications network 108 as shown in FIG. 1. In another embodiment, the cache controller is part of the access network.

In one embodiment, the proxy server is a transparent proxy that passes requests and responses between user/client devices (such as the user device 102) and host servers (such as the content provider 106) without modifying the requests and responses (e.g., gateway or tunneling proxy). In another embodiment, the proxy server is a non-transparent proxy that can modify requests and responses in order to provide added services, such as group annotation services, media type transformation, or protocol reduction. The cache controller is coupled to a cache, which may be located in the same server as the cache controller or may be in a different location. The cache is a component that stores data, such as a storage device managed by a caching proxy.

The content provider 110 is any device or system that hosts content elements. In one embodiment, the content provider is an Internet-connected host or server that is identified by a URI or a URL and hosts Internet accessible content elements. Content providers are well known in the field. The content provider is, for example, a web server that can be accessed via Hypertext Transfer Protocol (HTTP), Internet Message Access Protocol (IMAP), or File Transfer Protocol (FTP). The content element is any data suitable to be transferred in a networked environment, such as markup language files, scripting language files, video files, music files, image files or any other type of resource that can be located and addressed through, for example, the Internet. In a non-limiting example, the content element includes an HTML file.

In operation, the cache controller 106 facilitates caching of content elements accessed via dynamic URLs. The cache controller performs the functions of generating static content element identifiers with only parameters relating to the requested content element from HTTP requests based on dynamic URLs. The user device 102 is linked to the cache controller via the access network 104 and the cache controller is connected to the content provider via the communications network 108. The cache controller is configured to generate a static content element identifier from an HTTP request that is based on a dynamic URL, where all the dynamic parameters not relating to the content element are removed. The static content element identifier is used to determine whether a content element requested from the user device via the dynamic URL is present in the cache, and the static content element identifier is also used to index the cache by linking the static content element identifier to the requested content element. Using the static content element identifier, rather than dynamic portions of the dynamic URL or HTTP request to index the cached content element will result in a more efficient cache that avoids duplicate copies of the same content element and that ensures that cached content elements can be retrieved.

Figure 2:
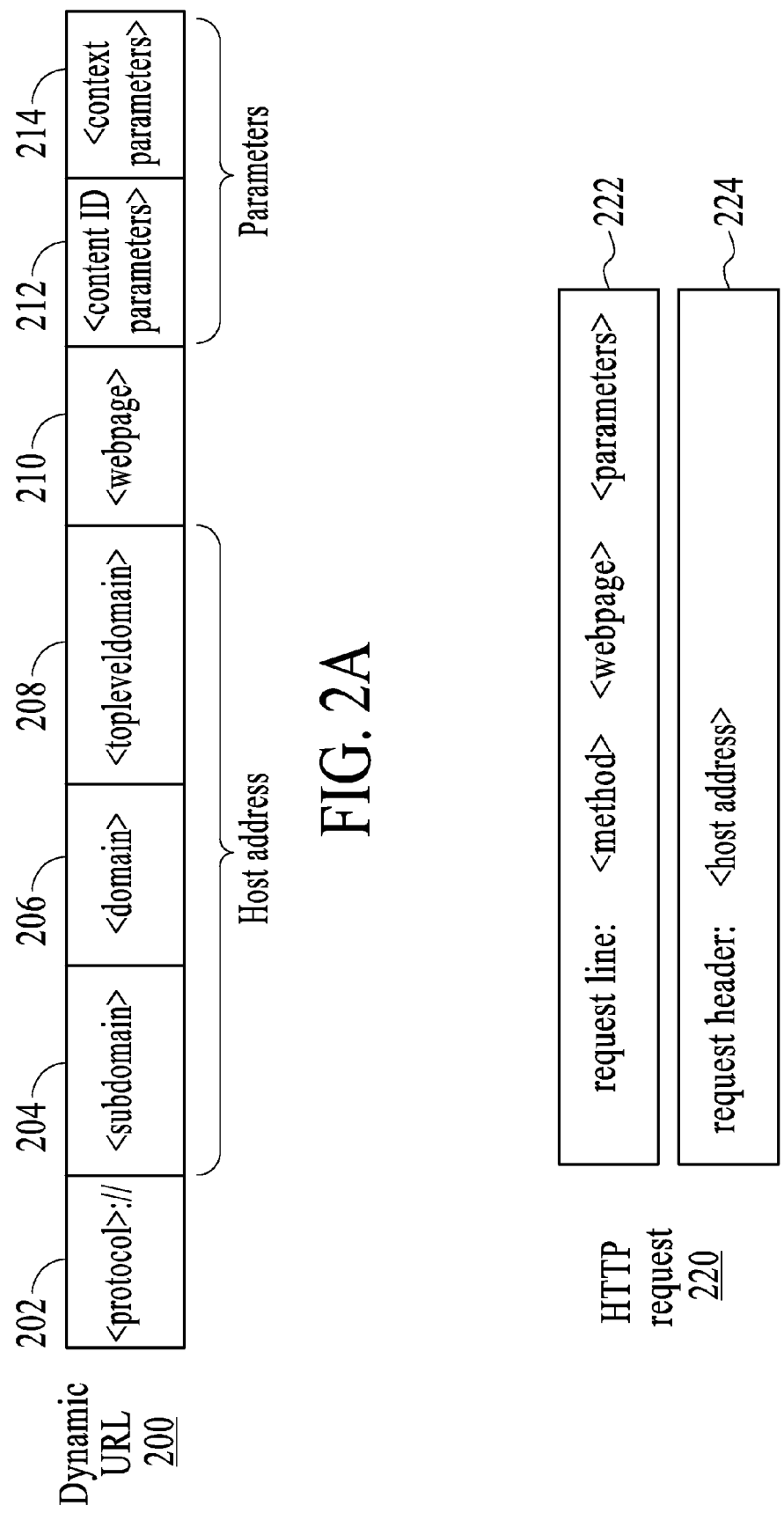
FIGS. 2A and 2B depict schematic diagrams of a dynamic URL and a corresponding HTTP request.

FIG. 2A depicts a schematic diagram of a dynamic URL 200. The dynamic URL depicted in FIG. 2A includes fields 202-214. A protocol field 202 defines the communication protocol being used to transfer the requested content element over the network connection. The communication protocol is a protocol used for data transfer over a network, including without limitation a hypertext transfer protocol (HTTP), a hypertext transfer protocol secure (HTTPS) or a file transfer protocol (FTP). A subdomain field 204 represents a subdomain, which is a section of a domain, where the domain field 206 identifies Internet protocol (IP) resources such as websites. The domain given by the domain field 206 in turn is a subdomain of a top level domain given by the top level domain field 208. The top level domain (TLD) is, for example, a generic TLD, such as .com, .org, or .net, or is a country code TLD, such as .uk, .de, or .fr. The subdomain, domain, and top level domain constitute the host address where the content element can be found. The URL optionally contains a webpage field 210 that points to a webpage. The webpage is typically an information resource (e.g. the requested content element) that is accessible through a web browser and is part of the website. In one embodiment, the webpage is a template in which to display the requested content element. The webpage is usually in HyperText Markup Language (HTML) format. Alternatively or additionally, the requested content element is indicated in the URL via a parameter (or query string), such as, for example, in the case of a dynamic URL. Static URLs only use a webpage field or a hierarchical structure of webpage fields to identify a content element and static URLs do not typically contain parameters such as query strings. In one embodiment, query string values are used to create the static URL. The parameters 212 and 214 are, for example, preceded by a question mark and typically consist of a sequence of <key>=<value> pairs separated by a semicolon or ampersand. In the case where a parameter is used to identify the content element, the webpage can be the page where the requested content element can be displayed. The parameters generally include a content identifying part 212 and a dynamic part 214 that is dynamically generated depending on factors that may be independent of the requested content element.

The URL 200, including the parameters, is considered a dynamic URL because the dynamic URL directs a user to a dynamic webpage and/or is displayed on a dynamic webpage. In a dynamic webpage, page content can be retrieved from a database and the content depends on different contexts or conditions, such as user specific data (e.g. preferences deduced from login credentials), environmental data (e.g. time and date), or any other data related to the data traffic between the user's web browser and the content server or interactions between a user and an origin webpage from which the dynamic URL was selected. The parameters in the dynamic URL can also be used by the content server to gather information on browsing patterns of users browsing the origin webpage. In a non-limiting example, a video provider's webpage contains two or more hyperlinks to the same content element (video) at different locations on the webpage (e.g. one in a 'recommended videos' section and one in a 'related videos' section). In order to know which hyperlink was selected by a user, the URLs of the hyperlinks contain dynamic parameters indicating which hyperlink was selected. A user selecting a hyperlink in the 'recommended videos' section may indicate that the user is also interested in the hyperlinked video and this allows the content provider to build a profile about the preferences of the user. Similarly, the number of users selecting the hyperlink in the 'related videos' selection may indicate the degree of similarity between the hyperlinked video and the video that was playing before the hyperlink was selected. In both cases, the URL contains the same parameter indicating the content element (i.e. content identification parameters) but contains different parameters relating to other contexts such as to the hyperlink selection (i.e. dynamic parameters).

An example of a first URL is:
http://www.videosite.com/watch?v=UvEU8EaciFo&feature=rec-LGOUT-real_rn-4r-1-HM
An example of a second URL for the same content element (e.g. video file) is:
http://www.videosite.com/watch?v=UvEU8EaciFo&feature=related
Both URLs point to the same video (i.e. the video whose key 'v' has the value 'UvEU8EaciFo') but have different dynamic parameters (which can also be regarded as context parameters). The first URL has a dynamic parameter 'feature=rec-LGOUT-real rn-4r-1-HM', indicating that the hyperlink is featured in the 'recommended videos' section and has a tag 'real_rn-4r-1-HM'. The field LGOUT indicates that the user that was presented with the URL was not logged into the videosite with login credentials. The second URL has a dynamic parameter 'feature=related', indicating that the user selected the hyperlink in the 'related videos' section. The dynamic parameters in the two URLs change, whereas the content element to be transferred to the user device remains the same. The webpage field 'watch' in the above example points to the webpage frame where the content element will be displayed, but the content element itself is given by the content identification parameter. Because the same video content element is provided to the user regardless of which URL is selected, it would be redundant to cache the same video content element twice under the two different URLs.

In one embodiment, the dynamic parameters include validation parameters used by the content provider for access control. The validation parameters include, for example, information about the subscription status of the user or information about the hardware and/or software (e.g. codecs) used by the user device to access the requested content element. The validation parameters can therefore be used to ensure that the content element can be served to the user. The validation parameters may change from user to user, whereas the content identification parameters remain the same for the same requested content element.

FIG. 2B depicts a schematic diagram of an HTTP request 220. The HTTP request is generated in response to a URL, for example, such as the URL depicted in FIG. 2A. The HTTP request is generated at the user device (usually by a web browser) when the user selects the URL, and the request is sent from the user device to a host (content provider) where the address is given by information contained in the URL (i.e. host address). The HTTP request includes at least a request line 222 and a request header 224, as shown in FIG. 2B. The request header includes the host address. The request line includes an HTTP method and a resource name. The method is, in a non-limiting example, a standard HTTP method, such as GET or HEAD. The resource name includes a webpage field and parameters. The method GET results in retrieval of the requested content element given by the resource name and the request is directed to the content provider as given by the host address. In response to the HTTP request from the user device to the content provider, the content provider transmits an HTTP response including a status report (e.g. 200 OK). The HTTP response may further include a body containing the webpage and/or the requested content element. The HEAD method is similar to the GET method but only results in the HTTP response headers (including the status report) being transmitted, without the body being transmitted to the user device.

The request line of the HTTP request includes the webpage field and the parameters (resource name). The request header of the HTTP request indicates the host address. As shown in FIG. 2B, the request line includes the fields:
<method><webpage>?<parameters>
The request header includes at least:
<host address>
To illustrate an example of an HTTP request that is generated from the first URL described above with reference to FIG. 2A, the HTTP request would have as a request line:
GET/watch?v=UvEU8EaciFo&feature=rec-LGOUT-real_rn-4r-1-HM HTTP/1.1
The HTTP request would further include the request header indicating as host:
www.videosite.com.

Figure 3:
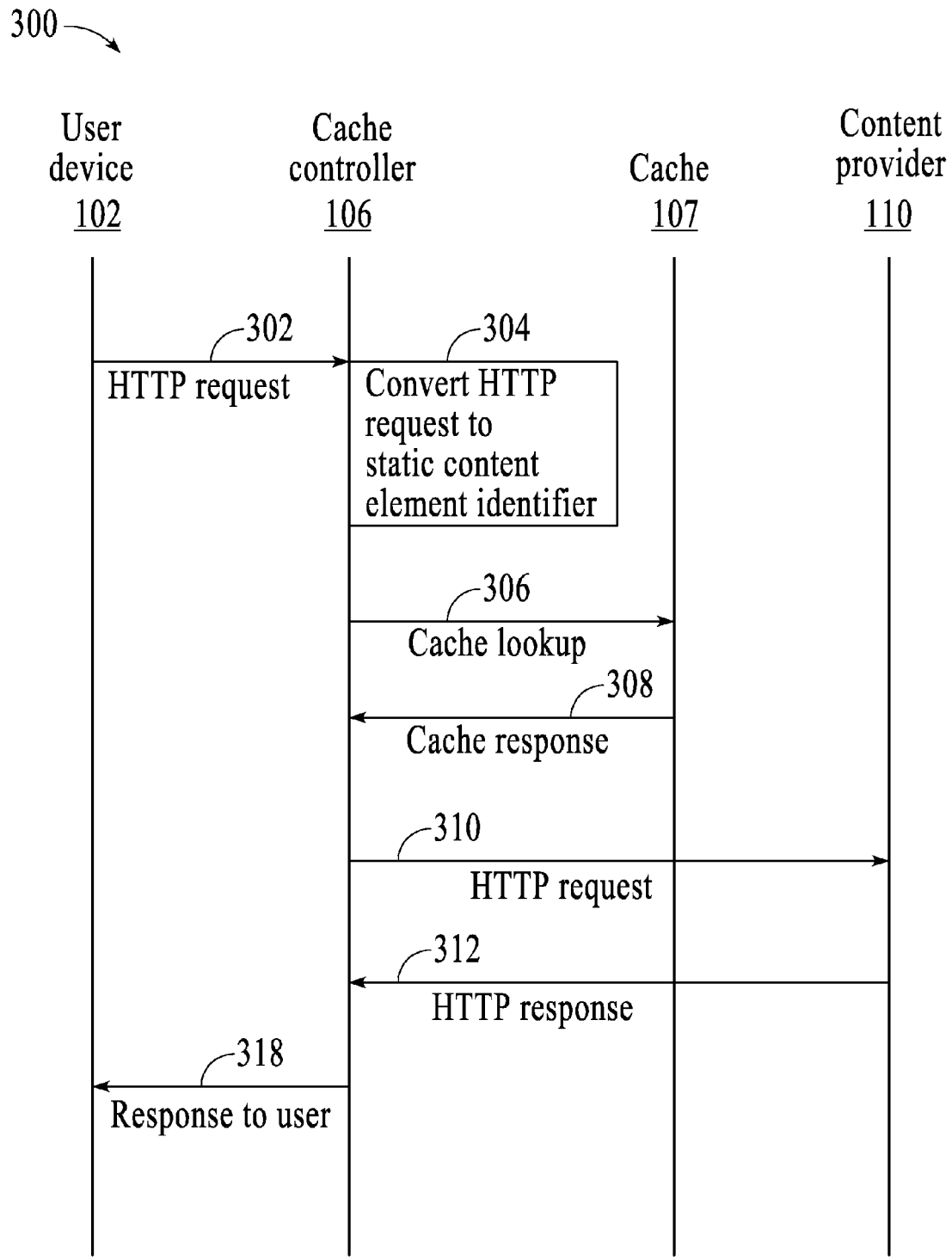
FIG. 3 depicts a schematic diagram of communications between a user device and a content provider through the cache controller in accordance with an embodiment of the invention.

FIG. 3 depicts a schematic diagram of communications between a user device and a content provider through the cache controller in accordance with an embodiment of the invention. As shown in FIG. 3, in step 302 the cache controller 106 is configured to intercept HTTP requests from the user device 102 to the content provider 110. The cache controller receives the HTTP request, including information from the dynamic URL from which the HTTP request was generated. The HTTP request typically contains at least an HTTP method and a resource name obtained from the dynamic URL, as described above with reference to FIGS. 2A and 2B. The HTTP request is sent from the user device and is targeted for the host address given in the dynamic URL.

In the example of FIG. 3, the user device generates an HTTP request for a content element when a hyperlink including the dynamic URL is selected by a user in a web browser. The HTTP request contains information obtained from the dynamic URL, and the HTTP request is sent to a host address given in the dynamic URL, whereby the host address specifies the host where the requested content element can be found.

As shown in FIG. 3, after the HTTP request is intercepted by the cache controller in step 302, the cache controller obtains at least parts of the information contained in the HTTP request in step 304, where the information is at least in part based on the dynamic URL. The HTTP request is based on the dynamic URL and includes content identification parameters and dynamic parameters, where the content identification parameters are specific to the content element being requested and the dynamic parameters vary as a function of the user device from which the content element was requested, as a function of the browsing patterns of the users, or as a function of any other context that may be independent from the content element itself. The cache controller generates a static content element identifier from the HTTP request, whereby the static content element identifier contains only parameters relating to the content element. The cache controller therefore removes the dynamic parameters from the HTTP request to create the static content element identifier, whereby the static content element identifier includes, for example, a character string specifically identifying a content element. The static content element identifier typically includes information about the host address and the name of the requested resource (content element). In one embodiment, the static content element identifier is a URI, such as a URL or URN. In a non-limiting example, the static content element identifier is a static URL containing only content specific information or is a dynamic URL that is independent of dynamic parameters, such as parameters relating to the users. Removing the dynamic parameters results in a URL that corresponds to the requested content element regardless of changes in dynamic fields of the dynamic URL, and hence of changes in the HTTP request.

In one embodiment, the content identification parameter of the dynamic URL is recognized by the cache controller using a table which indicates how the content provider identifies a content element in the dynamic URL, such as by using a specific key. In a non-limiting example, the key for the content element for the host 'www.videosite.com' may be 'v', whereby the value of that key represents the resource name for the requested content element. All other <key>=<value> pairs, delimited from the 'v' key and the corresponding value by an ampersand, are ignored and removed from the dynamic URL to create the static content element identifier. The static content element identifier is therefore solely based on the content identification parameter.

Alternatively, the content identification parameter may be determined by sending a modified HTTP request to the content provider, where the modified HTTP request contains a HEAD method and the request line contains only a first parameter from the plurality of parameters in the original HTTP request. If the modified HTTP request results in a positive response (e.g. HTTP response 200 OK) then the first parameter is likely the parameter representing the requested content element. If, on the other hand, an error message is received in the HTTP response from the content provider, the first parameter is likely not the parameter representing the requested content element. The above steps can be repeated with a subsequent parameter from the parameters in the original HTTP request until a positive response is received. Since only a HEAD method is used with the modified HTTP request, there is limited added load on the network between the cache controller and the content provider as no body (i.e. no content element) is returned with the HTTP response from the content provider. However, the HEAD method provides enough information about the body, such as file type and other information, to allow the cache controller to identify when the correct parameter, representing the content element, is selected.

In step 306, the cache controller performs a cache lookup in cache 107 using the static content element identifier. Because the static content element identifier is agnostic to dynamic parameters, the static content element identifier will be the same for the same requested content element. This allows the cache controller to recognize a cached content element that was requested by the user device using a dynamic URL, without creating duplicate caches of the same content element. The cache lookup is, for example, performed by comparing the current static content element identifier to a table of static content element identifiers and their corresponding content elements, as will be described in more detail with regard to FIG. 4 below.

In step 308, the cache controller receives a cache response indicating whether or not a cached item has been found for the requested content element. If the response is positive, i.e. the requested content element had been cached previously, the request can be fulfilled from the cache and the requested content element is sent from the cache to the user device in steps 308 and 318. The cache controller may also be bypassed when sending the cached content element to the user device. Steps 310 and 312 are optional and can be used to verify that the user has the right access privileges, for example, before the content element is sent to the user. In this case, the original HTTP request (as opposed to the modified HTTP request) is sent to the content provider in step 310. The content provider's address is given by the host address in the URL. Using the original HTTP request, the content provider determines whether the content element can be served to the user. In one embodiment, the original HTTP request is slightly modified before transmission in step 310 such that the method is changed from GET to HEAD in order to avoid unnecessarily receiving the body of the response, since the content element is already in cache. In one embodiment, if the GET method is used, the connection between the content provider and the cache controller is closed after the headers of the response are received. Steps 310 and 312 may be omitted or may be performed only once for a stream of related content elements, such as file chunks in adaptive streaming applications or in HTTP-Progressive Download.

If the response for the cache lookup in steps 306 and 308 is negative, the content element is downloaded from the content provider. In this case, the original HTTP request from the user device, including the GET method, is forwarded to the content provider. The downloaded content element is then placed into the cache and forwarded to the user device that requested the content element. It may also be necessary to download a newer version of the requested content element even if the content element is present in the cache if it is determined that the content element in the cache is out of date. For example, the content element in the cache has an expiration date in order to allow determination of its validity, or the content element in the cache is compared to an entity tag received in step 312.

Figure 4:
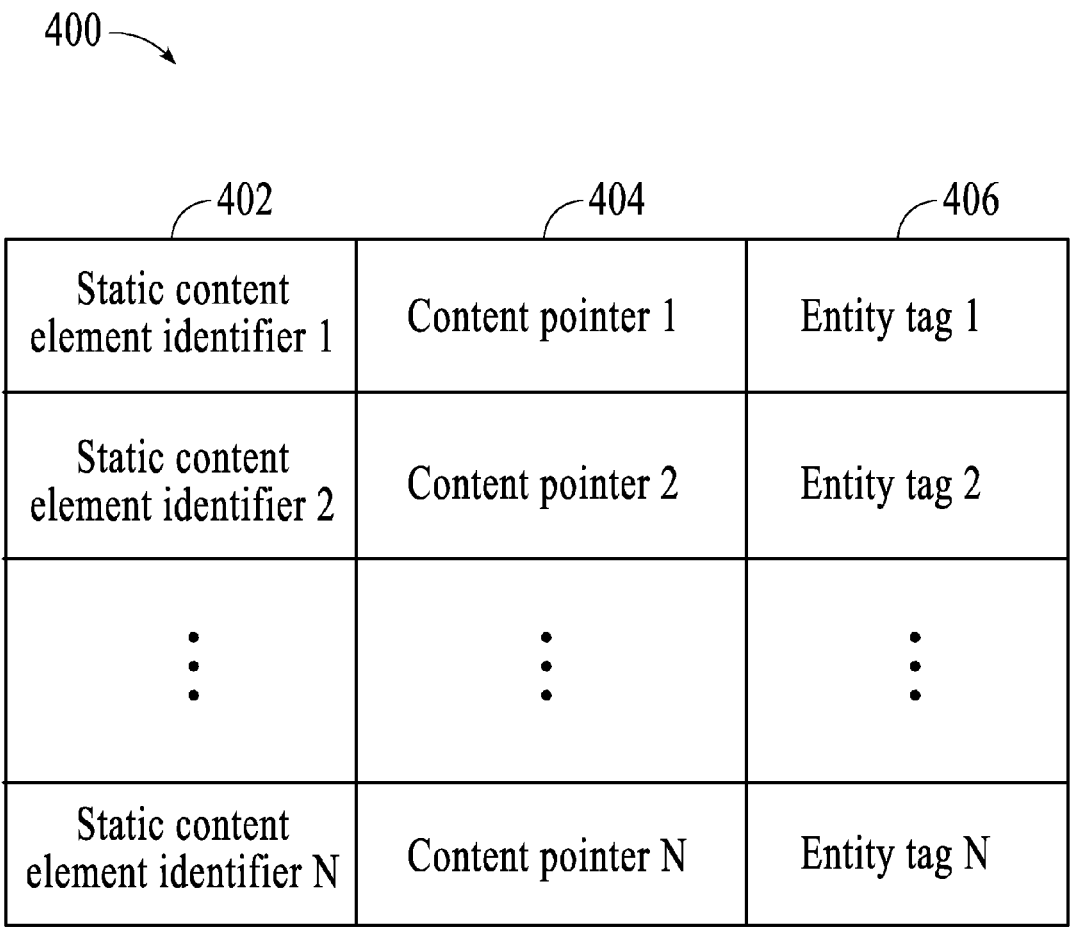
FIG. 4 depicts a schematic diagram of a cache lookup table in accordance with embodiments of the invention.

FIG. 4 depicts a schematic diagram of a cache lookup table in accordance with embodiments of the invention. The cache lookup table is used during a cache lookup to determine whether a requested content element is present in the cache. The cache lookup table includes a column of static content element identifiers 402, a column of content pointers 404, and optionally a column of entity tags 406. The static content element identifiers indicate the requested content element. The content pointers indicate the location of the content element that is assigned to the static content element identifier. The entity tag gives further information about the content element in the cache, as described below. Each time a particular static content element identifier is created from an HTTP request initiated via a dynamic URL, the cache controller does a lookup to determine whether or not that particular static content element identifier is present in column 402 of the lookup table. The first time that a content element (say content element 1) is received at the cache controller, that content element is transferred to the cache and the static content element identifier 1 that resulted in the download of the content element 1 is assigned a pointer to the content element (content pointer 1) in the cache. Each subsequent time a static content element identifier is generated, and a table lookup reveals that the static content element identifier is the same as the static content element identifier 1, content pointer 1 is used to send content element 1 from the cache to the requesting user device.

Every time the cache lookup reveals a miss (i.e. every first instance of a content element request), a new entry is added to the table. The content element that resulted in a cache miss is requested from the corresponding content provider and once received at the cache controller the content element is placed into the cache. A new entry is then added to the table, where the new entry includes the static content element identifier that was created as a result of the HTTP request. The static content element identifier is then assigned a corresponding content pointer, where the content pointer indicates the address where the content element can be found in the cache. The above examples of cache and table population are non-limiting and other techniques for organizing the cache and populating the cache lookup table are possible.

In one embodiment, each pair of static content element identifiers and content pointers are assigned an entity tag. The entity tag gives information about the content element, such as file size, file type, creation date, expiry date etc. The entity tag is compared to an entity tag received in the HTTP response in step 312 of FIG. 3, and the comparison is used to determine whether the file version in the cache is the same as the file version of the content element present in the cache.

Figure 5:
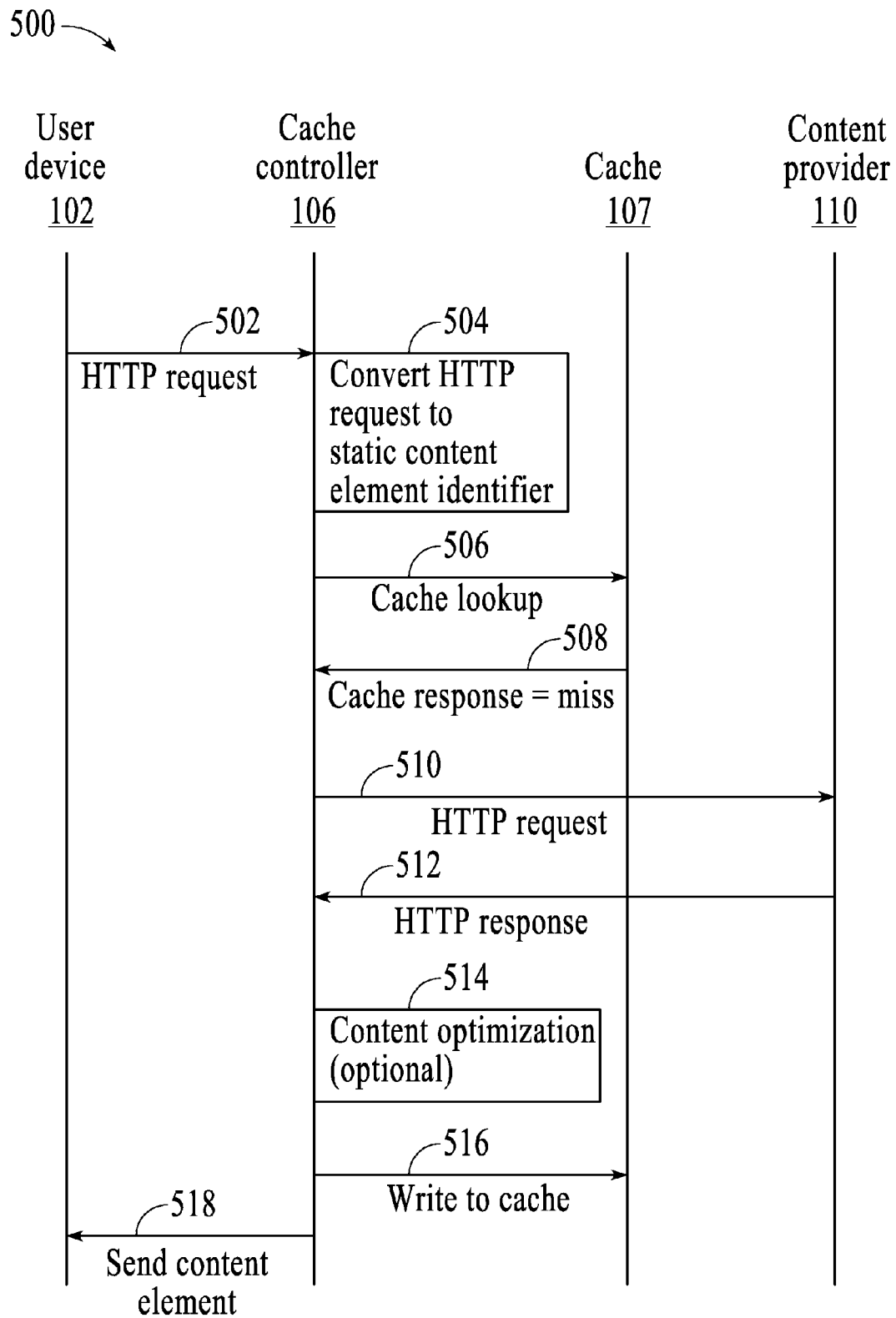
FIG. 5 depicts a schematic diagram of communications between a user device and a content provider through the cache controller in accordance with an embodiment of the invention.

FIG. 5 depicts a schematic diagram of communications between a user device and a content provider through the cache controller in accordance with another embodiment of the invention. Steps 502 to 506 of FIG. 5 are similar to steps 302 to 306 of FIG. 3. In the example of FIG. 5, a special case is presented in which the requested content element had not previously been cached. In step 508, it is determined that the requested content element is not present in the cache. Consequently, in step 510, the original HTTP request of step 502 is sent from the cache controller to the content provider. As a result, the content provider is able to determine whether the content element can be served to the requesting user device. The content provider then sends an appropriate HTTP response to the cache controller in step 512. The HTTP response may indicate that the user does not have sufficient access privileges. If the HTTP response is positive, the HTTP response, including the content element, is served to the cache controller. The content element is optionally optimized in step 514 before being transmitted to the user device if the cache controller determines that such an optimization is necessary or favorable. Such determination is, for example, a result of the cache controller knowing the type of user device or the software installed on the user device. In one embodiment, the cache controller is part of a wireless service provider network and the user device is a wireless device, such as a mobile phone, that is a valid subscriber to the wireless service provider network. The wireless service provider network may therefore have knowledge of the specific type of device used by the requesting user. The cache controller can optimize the content element to allow the content element to be viewed on the user device, such as by transforming the content element into the right format by transcoding the content element (e.g. for a video file) or resizing the content of the content element to the right size (e.g. for an image file). In one embodiment, the content element is served to the user device unmodified the first time that the content element request results in a cache miss, and the content element is only optimized and served in the optimized form each subsequent time that the content element is requested.

The optimized or original content element is then written to the cache in step 516. The static content element identifier resulting from the original HTTP request is assigned a pointer to the content element and is placed in the lookup table, as described above with reference to FIG. 4. The content element in its optimized or original form is then sent to the user device in step 518.

Figure 6:
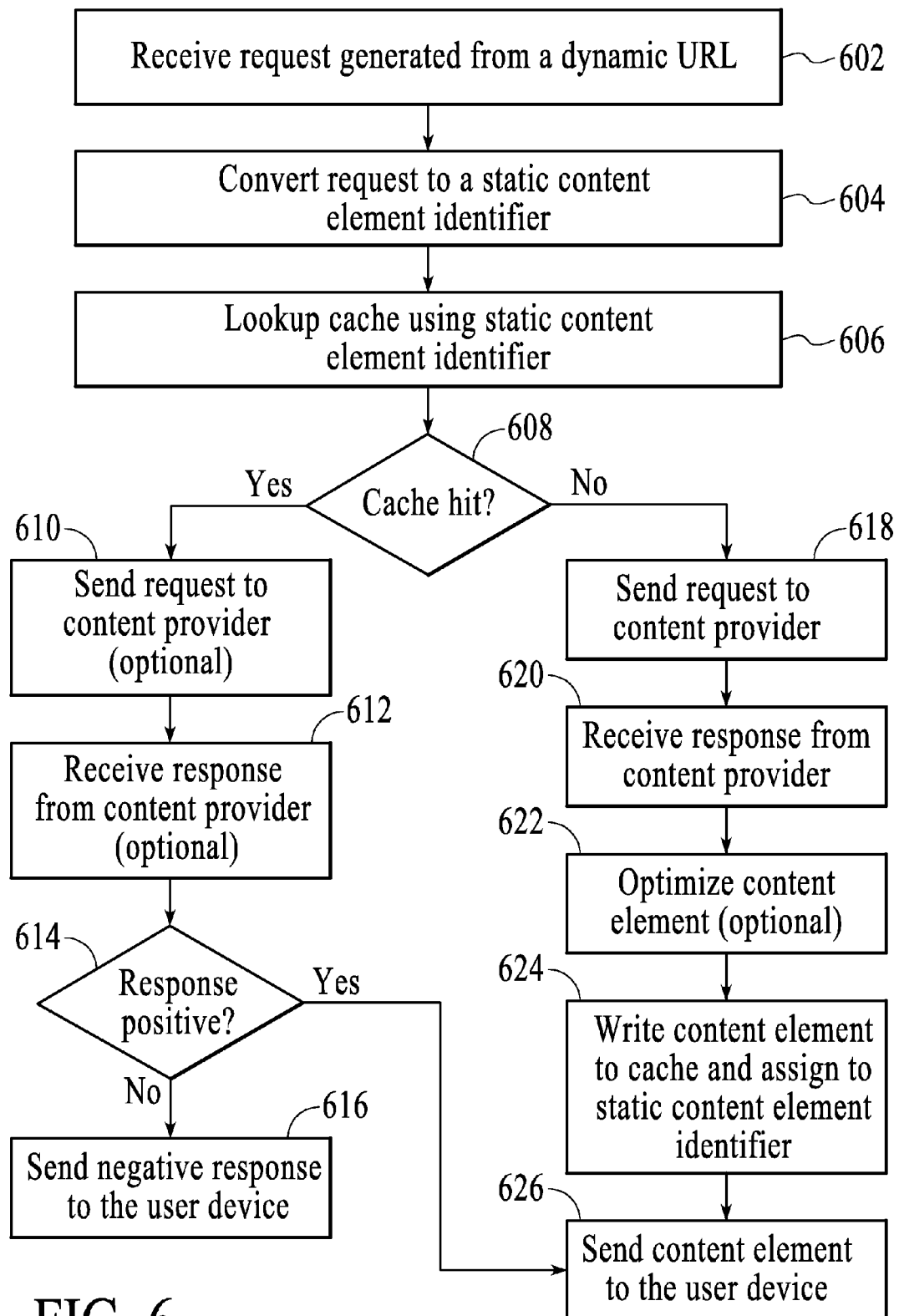
FIG. 6 is a flow diagram of a method for caching content elements with dynamic URLs in accordance with an embodiment of the invention.

FIG. 6 depicts a flow diagram of a method for caching content elements with dynamic URLs in accordance with an embodiment of the invention. At block 602, a request generated as a result of a dynamic URL is received from a user device. The dynamic URL includes dynamic parameters such as context parameters. Next, at block 604, a static content element identifier is generated from the request. The static content element identifier only includes the content identification parameters and does not include the dynamic parameters. Next, at block 606, a cache lookup is performed using the static content element identifier. The cache lookup can be performed by using a table with a list of content element identifiers mapped to corresponding pointers to content elements. Next, at decision block 608, it is determined whether a cache hit has occurred. It is, for example, determined that a cache hit has occurred when the static content element identifier matches one of the content element identifiers in the list. If a cache hit has occurred, the process may continue to optional block 610 where the original request is sent to the content provider. In one embodiment, the original request is modified to replace the GET method by a HEAD method before being sent to the content provider. Next, at block 612, a response is received at the cache controller from the content provider. In one embodiment, the response includes an indication of whether or not the content element can be served to the user device (due to compatibility issues or access rights). At decision block 614, it is determined whether the response is positive or negative. If the response is negative, the process continues to block 616, where an error message is sent to the user device. If the response at decision block 614 is positive, the process continues to block 626 where the content element is sent to the user device from the cache, whereby the location of the content element in the cache is given by the content element pointer associated with the content element identifier that matched the static content element identifier. The content element may be optimized before being sent to the user device, or the content element stored in cache may already be optimized for the user device.

If there is not a cache hit at decision block 608, the process continues to block 618 where the original request is sent to the content provider in order to request the content element, and the content provider may optionally determine whether the user device has the appropriate access rights to access the content element. Next, at block 620, a response is received from the content provider. In one embodiment, the response includes the content element as a body or includes an access denial message. The content element may further be optimized at block 622 if the cache controller or the content provider deems an optimization necessary or favorable. Next, at block 624, the content element (original or optimized) is written to the cache and assigned the static content element identifier. At block 626, the content element is sent to the user device. The content element is sent from the content provider if there is not a cache hit.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Figure 7:
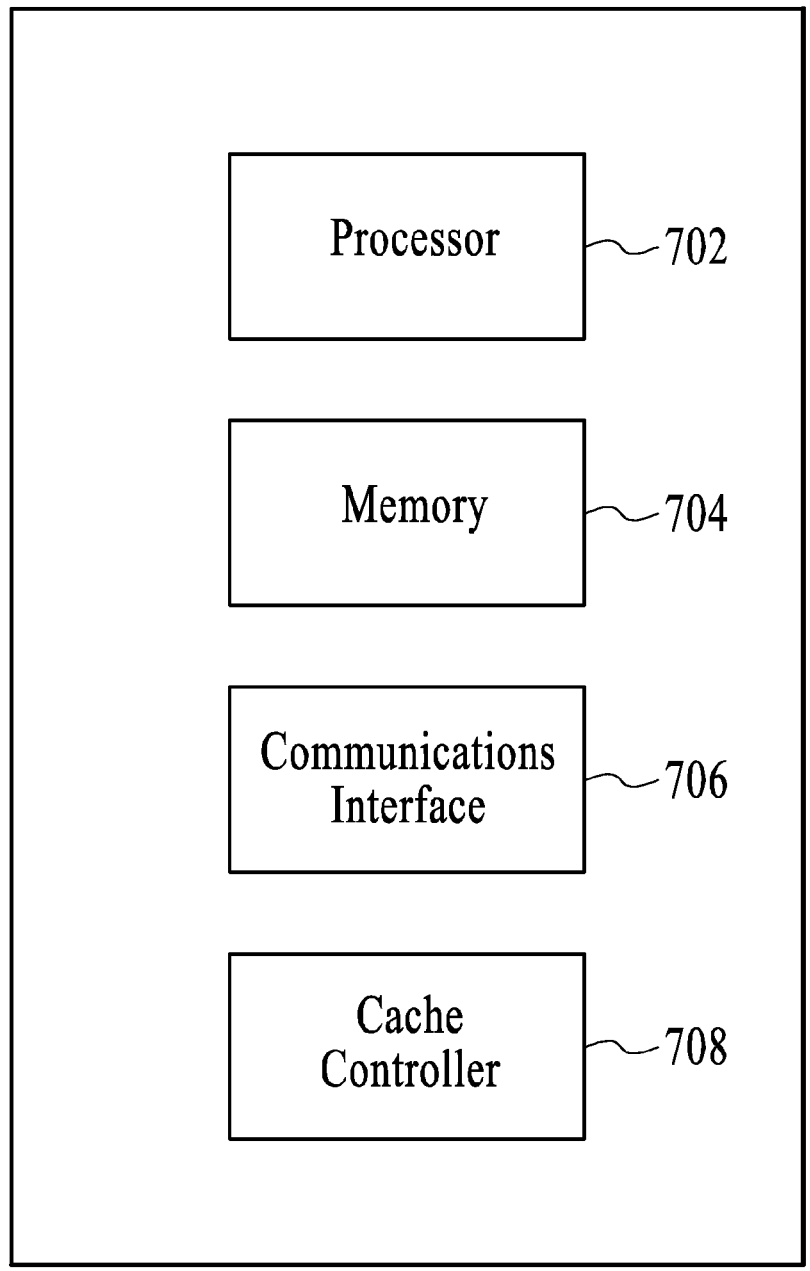
FIG. 7 depicts a computer that includes a processor, memory, and a communications interface.

In an embodiment, the functionality of the cache controller system of FIGS. 1-6 is performed by a computer that executes computer readable instructions. FIG. 7 depicts a computer 700 that includes a processor 702, memory 704, and a communications interface 706. The computer may further include a cache controller 708, which performs the functions receiving an HTTP request generated from a dynamic URL, converting the information contained in the HTTP request to create a static content element identifier, and looking up a cache using the static content element identifier, as described above with reference to FIGS. 1-6. The cache controller may be implemented in hardware and/or software. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
   receiving a Hypertext Transfer Protocol (HTTP) request from a user device for a content element, the HTTP request being generated from a dynamic Uniform Resource Locator (URL), wherein the HTTP request indicates a GET method for retrieving the requested content;

generating a static content element identifier from the HTTP request by removing dynamic parameters from the HTTP request;

determining whether the content element is in a cache using the static content element identifier, wherein the cache is remote from the client device;

modifying the HTTP request from indicating the GET method to indicating a HEAD method in response to determining that the content element is in the cache;

sending the HTTP request indicating the HEAD method to a content provider at a host address given in the URL for the content provider to determine whether the content element can be served to the user device from the cache; and receiving a HTTP response from the content provider, the HTTP response comprising a header, the header indicating whether the user device has access privileges to the content element.

2. The method of claim 1, wherein the HTTP request includes content identification parameters and context parameters that were present in the dynamic URL, wherein the content identification parameters define the requested content element and the context parameters define the dynamic parameters, wherein generating the static content element identifier by removing dynamic parameters from the HTTP request comprises removing the context parameters.

3. The method of claim 1, wherein the determination of whether the content element is in the cache is performed using a cache lookup table, the cache lookup table including a list of content element identifiers versus pointers to content elements.

4. The method of claim 3, wherein if the static content element identifier matches one of the content element identifiers in the cache lookup table, the content element is determined to be present in cache.

5. The method of claim 3, wherein if the static content element identifier does not match one of the content element identifiers in the cache lookup table, the content element is retrieved from the content provider and is placed in the cache.

6. The method of claim 1, wherein the HTTP response includes an entity tag relating to the content element, wherein the entity tag is used to determine whether the content element in the cache is the same version as a content element stored at the content provider.

7. A non-transitory computer-readable storage medium comprising a set of computer-readable instructions stored thereon, which, when executed by a processing system, cause the processing system to receive a Hypertext Transfer Protocol (HTTP) request from a user device for a content element, the request being generated from a dynamic Uniform Resource Locator (URL), wherein the HTTP request indicates a GET method for retrieving the requested content;

generate a static content element identifier from the HTTP request by removing dynamic parameters from the HTTP request;

determine whether the content element is in a cache using the static content element identifier, wherein the cache is remote from the user device;

modify the HTTP request from indicating the GET method to indicating a HEAD method in responsive to determining that the content element is in the cache;

send the HTTP request indicating the HEAD method to a content provider at a host address given in the URL for the content provider to determine whether the content element can be served to the user device from the cache; and receive a HTTP response from the content provider, the HTTP response comprising a header, the header indicating whether the user device has access privileges to the content element.

8. The non-transitory computer-readable storage medium of claim 7, wherein the request includes content identification parameters and context parameters that were present in the dynamic URL, wherein the content identification parameters define the requested content element and the context parameters define dynamic parameters, wherein generating the static content element identifier by removing dynamic parameters from the HTTP request comprises removing the context parameters.

9. The non-transitory computer-readable storage medium of claim 7, wherein the determination of whether the content element is in the cache is performed using a cache lookup table, the cache lookup table comprising a list of content element identifiers versus pointers to content elements.

10. The non-transitory computer-readable storage medium of claim 9, wherein if the static content element identifier matches one of the content element identifiers in the cache lookup table, the content element is determined to be present in the cache.

11. The non-transitory computer-readable storage medium of claim 9, wherein if the static content element identifier does not match one of the content element identifiers in the cache lookup table, the content element is retrieved from the content provider and is placed in the cache.

12. An apparatus comprising:
a processor; and
a memory for storing executable instructions, which when executed by the processor perform the steps of:

receiving a Hypertext Transfer Protocol (HTTP) request from a user device for a content element, the HTTP request being generated from a dynamic Uniform Resource Locator (URL), wherein the HTTP request indicates a GET method for retrieving the requested content;

generating a static content element identifier from the HTTP request by removing dynamic parameters from the HTTP request;

determining whether the content element is in a cache using the static content element identifier, wherein the cache is remote from the user device;

modifying the HTTP request from indicating the GET method to indicating a HEAD method in response to determining that the content element is in the cache;

sending the HTTP request indicating the HEAD method to a content provider at a host address given in the URL for the content provider to determine whether the content element can be served to the user device from the cache; and receiving a HTTP response from the content provider, the HTTP response comprising a header, the header indicating whether the user device has access privileges to the content element.

13. The apparatus of claim 12, wherein the HTTP request includes content identification parameters and context parameters, wherein the content identification parameters define the requested content element and the context parameters define dynamic parameters, and wherein generating the static content element identifier by removing dynamic parameters from the HTTP request comprises removing the context parameters.

14. The apparatus of claim 12 further comprising a cache lookup table of content element identifiers versus pointers to content elements.

15. The apparatus of claim 14, wherein the content element is looked up in the cache using the cache lookup table, wherein if the static content element identifier matches one of the content element identifiers of the cache lookup table, the content element is determined to be present in the cache.

16. The apparatus of claim 14, wherein the content element is looked up in the cache using the cache lookup table, wherein if the static content element identifier does not match one of the content element identifiers, the content element is requested and upon receipt is placed in the cache, and further wherein the static content element identifier is added to the table with a corresponding pointer to the content element in the cache.

17. The method of claim 5, wherein the static content element identifier is added to the cache lookup table with a corresponding pointer to the content element that has been placed in the cache.

18. The method of claim 1, further comprising:
   sending the content element from the cache to the user device in response to the header of the HTTP response indicating that the user device has access privileges to the content element.

19. The method of claim 1, wherein the HTTP response includes an entity tag relating to the content element, the entity tag indicating one or more of: a file size, a file type, a creation date and an expiry date of the content element.

* * * * *